United States Patent
Shahramian et al.

(10) Patent No.: US 9,584,230 B2
(45) Date of Patent: Feb. 28, 2017

(54) TECHNIQUE FOR MONITORING AND MANAGING OUTPUT POWER

(71) Applicant: Alcatel-Lucent USA Inc., Murray Hill, NJ (US)

(72) Inventors: Shahriar Shahramian, Chatham, NJ (US); Yves Baeyens, Stirling, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/713,295

(22) Filed: May 15, 2015

(65) Prior Publication Data
US 2016/0337051 A1    Nov. 17, 2016

(51) Int. Cl.
*H04B 17/00*    (2015.01)
*H04B 17/10*    (2015.01)
*H04B 17/18*    (2015.01)

(52) U.S. Cl.
CPC ............ *H04B 17/103* (2015.01); *H04B 17/18* (2015.01)

(58) Field of Classification Search
CPC .................................................... H04B 17/103
USPC ........................................................ 455/115.1
See application file for complete search history.

(56) References Cited

U.S. PATENT DOCUMENTS

2014/0313088 A1* 10/2014 Rozenblit ............ H04B 1/0458
343/745

\* cited by examiner

*Primary Examiner* — Sanh Phu
(74) *Attorney, Agent, or Firm* — Hassan Shamsaei Far

(57) ABSTRACT

An apparatus is disclosed configured for receiving a first alternating signal and for transmitting a second alternating signal. A detector is configured to receive a third alternating signal which is a reflection of at least a portion in power of the second alternating signal. The detector is further configured to convert the third alternating signal into a rectified signal and measure the power of said rectified signal. The measured power of the rectified signal is indicative of a power of the reflected third signal.

20 Claims, 2 Drawing Sheets

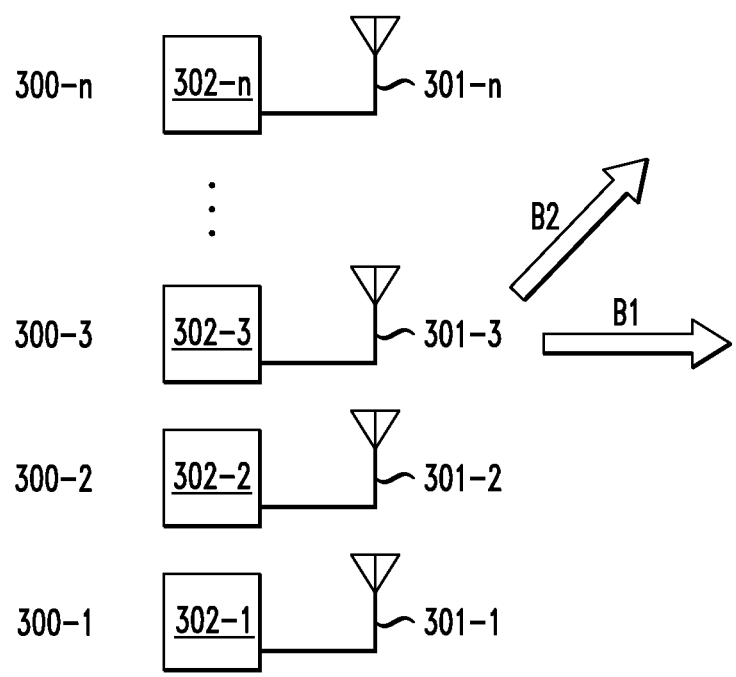

TECHNIQUE FOR MONITORING AND MANAGING OUTPUT POWER

FIELD

The present disclosure relates to a technique for monitoring and managing power in electronic equipment.

BACKGROUND

This section introduces aspects that may help facilitate a better understanding of the disclosure. Accordingly, the statements of this section are to be read in this light and are not to be understood as admissions about what is in the prior art or what is not in the prior art.

As it is known, electronic equipment typically use power amplifiers in the final stages of circuitry before transmitting a signal, for example over an antenna in a wireless transmission system. The power amplifiers are typically in charge of amplifying a signal for transmission such that the amplified signal has sufficient power to propagate a specific distance to reach a destination station such as a receiver. Such power amplifiers may be used in wireless or wireline communication systems.

SUMMARY

Some embodiments feature an apparatus comprising:
a first input port for receiving a first alternating signal;
a first output port for transmitting a second alternating signal with an output power;
a first detector configured to:
  receive a third alternating signal, the third alternating signal being a reflection of at least a portion in power of the second alternating signal;
  convert said third alternating signal into a rectified signal; and
  measure a power of said rectified signal;
wherein said measured power of the rectified signal is indicative of a power of the reflected third signal.
Some embodiments feature a transmitter comprising:
an antenna; and
an apparatus, including:
a first input port for receiving a first alternating signal;
a first output port for transmitting a second alternating signal, with an output power, to said antenna;
a first detector configured to:
  receive a third alternating signal, the third alternating signal being a reflection of at least a portion in power of the second alternating signal from the input port of said antenna;
  convert said third alternating signal into a rectified signal; and
  measure a power of said rectified signal;
wherein said measured power of the rectified signal is indicative of a power of the reflected third signal.
Some embodiments feature a phased array antenna assembly comprising:
an array of antennas wherein one or more antennas from the array are each coupled to a respective apparatus; the apparatus including:
a first input port for receiving a first alternating signal;
a first output port for transmitting a second alternating signal, with an output power, to said antenna;
a first detector configured to:
  receive a third alternating signal, the third alternating signal being a reflection of at least a portion in power of the second alternating signal from the input port of said antenna;
  convert said third alternating signal into a rectified signal;
  measure a power of said rectified signal;
wherein said measured power of the rectified signal is indicative of a power of the reflected third signal.

BRIEF DESCRIPTION OF THE DRAWINGS

FIG. 3 is an exemplary schematic representation of a phased array antenna in which embodiments of the present disclosure may be employed.

DETAILED DESCRIPTION OF ILLUSTRATIVE EMBODIMENTS

In order to ensure proper functionality of the power amplifier (PA), the output of the power amplifier is typically monitored. Monitoring is often carried out by tapping off a portion of the amplified signal from the output of the PA and thereby testing and analyzing the tapped portion of the amplified signal to detect possible transmission problems such as linearization, output power efficiency and the like. This is typically due to the fact that PAs typically show non-linear behavior and load mismatch issues. Tapping off a portion of the output signal is often performed using a coupler.

However, there are certain drawbacks associated with the use of couplers such as loss, relative large size and often poor performance.

Figure 1:
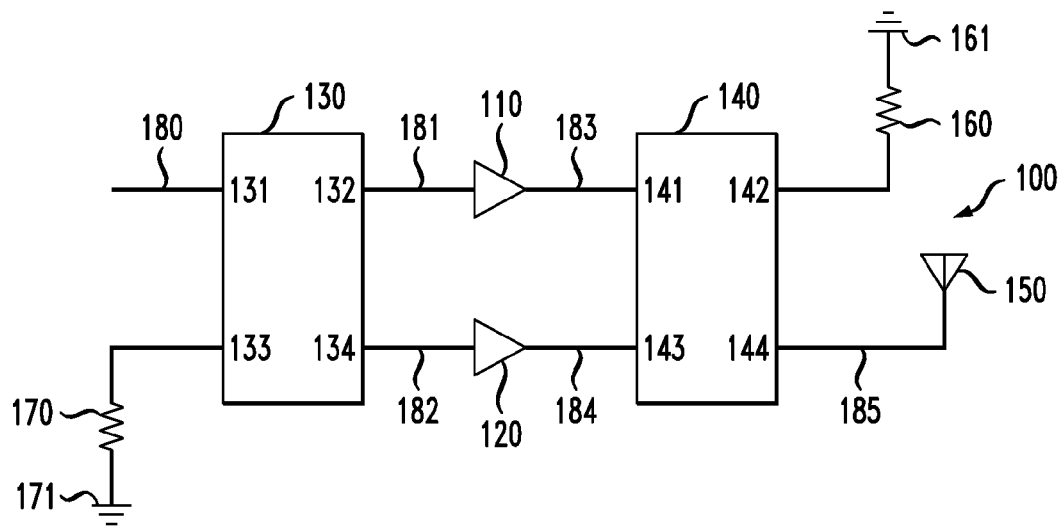
FIG. 1 is an exemplary schematic representation of a circuit including a balanced power amplifier arrangement according to known solutions.

As a remedy to the above drawbacks, use is often made of the so-called balanced PA arrangement. An example of a known balanced PA arrangement is shown in FIG. 1. Referring to FIG. 1, a balanced PA 100 comprises two power amplifiers 110 and 120 connected in parallel between a pair of Lange couplers, 130 and 140.

The first Lange coupler 130 may be configured to receive an input signal 180 through a first port 131. The signal 180 input into the Lange coupler is divided into two signals, typically by a 3 dB split, such that the two signals have a 90 degree phase difference between each other. The in-phase component of the split signal 181 is output from the Lange coupler 130 through a second port 132 and input into the first PA 110. The quadrature component of the split signal 182, being at 90 degrees phase shift with respect to the in-phase signals, is output from the Lange coupler 130 through a third port 134 and input into the second PA 120.

Each of the in-phase and quadrature signal components 181 and 182 are independently amplified in respective PAs 110 and 120 and are subsequently output, as shown by signals 183 and 184, from the PAs 110 and 120.

Amplified in-phase and quadrature signals, 183 and 184, are respectively input into input ports 141 and 143 of the second Lange coupler 140.

The second Lange coupler 140 shifts the in-phase signal 183 by 90 degrees. The 90 degrees shifted in-phase signal 183 and the quadrature signal 184 (also 90 degree shifted in the previous Lange coupler 130) are then summed up and provided at the output port 144 of the second Lange coupler 140 (this port 144 is also considered to be the output port of the balanced PA 100). The summed-up signal 185 is then provided at the output of the balanced PA 100 and input into the next component directly coupled to the output of the balanced PA.

However, in case there is a mismatch between the output impedance of the balanced PA 100 and the input impedance of the component immediately connected at its output, in this example antenna 150, at least a portion of the power of the output signal 185 is reflected back into the balanced PA.

The reflected signal propagates inside the second Lange coupler 140 and is eventually drained to ground 161 through isolated port 142 and resistive load 160 which is in charge of dissipating the energy of the reflected signal through heat. This drained power therefore constitutes power loss and is often referred to as return loss.

Likewise, if there is a mismatch between the output impedance of the first Lange coupler 130 and the input impedance of either one of the PAs 110 or 120 at least a portion of the power of the output signal 181 or 182 (as the case may be) may be reflected back into the first Lange coupler 130. The reflected signal then propagates inside the first Lange coupler 130 and is eventually drained to ground 171 through isolated port 133 and resistive load 170 which is in charge of dissipating the energy of the reflected signal through heat.

In order to obtain satisfactory performance of a balanced PA arrangement, it is desirable to avoid or at least minimize the return loss associated with possible mismatches as described above. In fact, in an ideal situation where the components of the above balanced PA arrangement would be working under no loss conditions and the impedances between the output of the balanced PA 100 and the antenna 150 were perfectly matched, no power would be reflected back from the antenna to the isolated ports.

However, real-life PAs typically have relatively large output impedances as compared to the input impedance of the components they feed in operation. As a result, matching the impedances between the output of the PA and the input of the component immediately connected to it is often not an easy task. For this reason designing balanced PAs with low return loss is typically difficult.

Embodiments of the disclosure aim at addressing the above problem. One exemplary embodiment is represented in FIG. 2.

Figure 2:
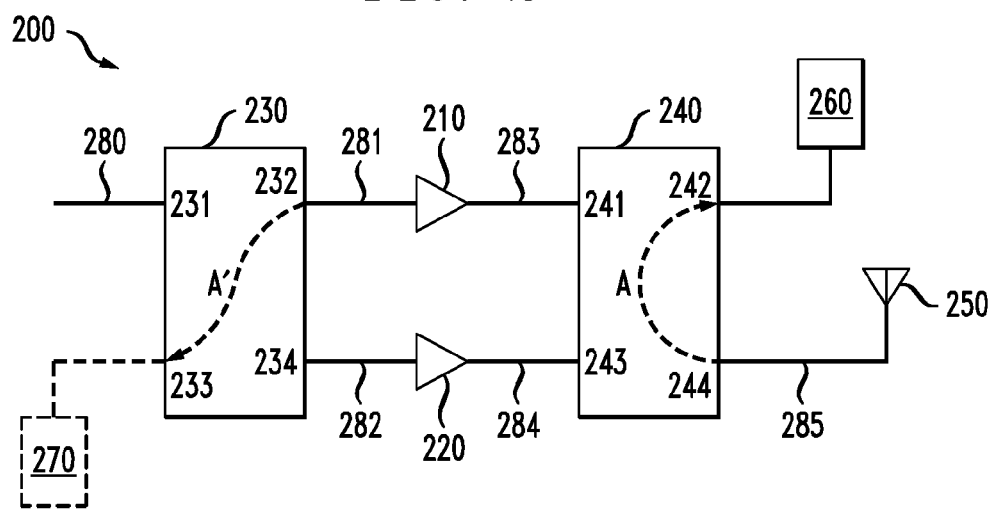
FIG. 2 is an exemplary schematic representation of a circuit including a balanced power amplifier arrangement according to some embodiments of the disclosure.

Referring to FIG. 2, the apparatus 200 comprises a balanced PA which includes at least two power amplifiers 210 and 220 connected in parallel between a pair of couplers, 230 and 240.

In the exemplary embodiment represented in FIG. 2 the couplers 230 and 240 are Lange couplers. However the disclosure is not so limited and the apparatus proposed herein can make use of any quadrature coupler for the intended purpose. One example of such alternative couplers is a 90 degree coupler.

The first Lange coupler 230 may be configured to receive an input signal 280 through a first port 231 (this port 231 is also considered to be the input port of the apparatus 200). Input signal 280 may be an alternating signal having relatively high frequencies.

In the context of the present disclosure high frequencies are to be understood to be in a range between hundreds of MHz to hundreds of GHz as long as the speed of the available semiconductor devices and the losses of couplers at the operating frequencies do not impose significant limitations.

The signal 280 input into the first Lange coupler 230 is divided into two signals such that the two signals have a 90 degree phase difference between each other. In some embodiments the signal $28_0$ may undergo a 3 dB split. The in-phase component of the split signal 281 is output from the Lange coupler 230 through a second port 232 and input into the first PA 210. The quadrature component of the split signal 282, being at 90 degrees phase shift with respect to the in-phase signals, is output from the Lange coupler 230 through a third port 234 and input into the second PA 220.

Each of the in-phase and quadrature signal components 281 and 282 are independently amplified in respective PAs 210 and 220 and are subsequently output as signals 283 and 284 from the PAs 210 and 220.

Amplified in-phase and quadrature signals, 283 and 284, are respectively input into input ports 241 and 243 of the second Lange coupler 240.

The second Lange coupler 240 is configured to shift the in-phase signal 283 by 90 degrees. The 90 degrees shifted in-phase signal 283 and the quadrature signal 284 (90 degree shifted in the previous Lange coupler 230) are then summed up and provided at the output port 244 of the second Lange coupler 240 (this port 244 is also considered to be the output port of the apparatus 200). The output signal, being an alternating signal at relatively high frequencies, is shown in the figure by reference numeral 285.

As mentioned above in relation to FIG. 1, in case there is a mismatch between the output impedance of the apparatus 200 and the input impedance of the component immediately connected at its output, at least a portion of the power of the output signal 285 is reflected back into the balanced PA 200.

In the example of FIG. 2 the component immediately connected at the output of the balanced PA 200 is an antenna 250. However the disclosure is not so limited and other elements configured for receiving output signals through other means such as wireline connections also are to be considered within the scope of the present disclosure.

However, in contrast to the known solutions (e.g. the apparatus of FIG. 1), according to the present disclosure, the reflected power may be used in order to detect the presence of a mismatch between the output impedance of the apparatus 200 and the input impedance of the component immediately connected at its output. To this end, apparatus 200 further comprises a detector 260 coupled to the output port 242 of the coupler 240.

With this arrangement, a signal which is reflected back from the output 244 of the apparatus 200, returns to the second Lange coupler 240 through port 244. The Lange coupler 240 then forwards the reflected signal to the output port 242 as shown by arrow A (however, arrow A by itself is not to be understood to represent the real propagation path of the reflected signal, as the latter may undergoes internal reflections within the Lange coupler 240. In an ideal situation (i.e. all components working ideally), then the reflected signal is only a function of the mismatch between the load, e.g. antenna, and the output of the balanced amplifier. This reflected signal is then input into detector 260.

On the other hand, if no impedance mismatch is present at the interface between the output of the apparatus 200 and the input of the antenna 250, no reflection occurs and thus detector 260 receives no signal. In such a case therefore, it may be assumed that maximum power may be transferred to the external component.

It is to be noted that if the connection between the output 244 and the antenna 250 is not broken but a mismatch exists between the two elements, a part of the total power may be reflected back to the second Lange coupler 240 and from the latter to the detector 260.

By measuring the power of a reflected signal, it is thus possible to detect that a mismatch indeed exists and appropriate measures may be taken in order to remedy the situation.

Preferably the detector is configured to satisfy the following conditions:

Provide a proportional DC signal output as a function of the signal power at its input.

Have sufficient bandwidth and is capable of accepting at its input signal frequencies of interest for the operation of the balanced PA.

Detector 260 may be of any known type preferably having a 50 ohms input impedance (which is a typical value used in this type of circuits). Detector 260 may preferably comprise a low frequency circuit to thereby avoid detecting signals at radio frequency (RF) ranges and preferably provides a DC output voltage indicative of the level of power detected from the reflected signal.

For the sake of clarity, it is noted that the term DC voltage as used herein is to be understood to include not only a voltage which is constant in time (such a voltage provided by a battery) but also a voltage which is a rectification of an alternating voltage (such as a voltage provided at the output of a known rectifier bridge) even if some variation time is present in such rectified voltage. Indeed, although a rectified voltage as described above may not, in real applications, be completely constant, such voltage is widely considered in the related art as a DC voltage and amplitude variations therein are often considered negligible.

In some embodiments the detector 260 may be based on a rectifier circuit concept comprising a bridge of diodes as is known to those skilled in the related art. A capacitor may be provided at the output terminals of the bridge to dampen and thereby reduce signal amplitude variations. Such bridge rectifier would serve to convert the reflected signal, which is often a high frequency AC signal, into a DC signal.

In some embodiments, the detector 260 may be an envelope detector configured to be used with linearization techniques. In such cases, the detector may comprise a diode and a capacitor connected in series. An alternating signal is rectified by the diode thus only allowing the passage of the signal when it is in forward biased mode. This rectified signal is then input into the capacitor which stores the charge and provides an output voltage which varies as the peak values of the input signal vary in time. The voltage variation provided at the output of the capacitor represents the envelope of the input RF signal.

The detector 260 measures power of the reflected signal. The envelope detector follows the envelope of the signal. Therefore if no envelope is detected, then there is a perfect impedance match. Furthermore, the shape of the envelope signal (which is not DC) may be used for linearization as well as I/Q balancing in a transmitter.

It is to be noted that the power of the reflected signal detected by the detector is proportional to the power which is output for transmission from the apparatus 200.

The apparatus as proposed herein further provides simple and cost effective testing and quality control functionalities.

Conventional testing and quality control processes of transmitter devices typically involve transmit a signal to a receiver and performing measurements at the receiver side. The transmission of the signal from the transmitter to the receiver is typically made using high frequencies, as described above, such as a radio frequency (RF). Therefore detection and measurements are also made at such radio frequency. However, detection and measurements at radio frequency levels is typically complex and expensive. Furthermore, at higher frequency rates, such tasks become even more difficult and expensive to perform.

In contrast, the apparatus as proposed herein enables a detection and measurement technique without the need to perform such assessments in RF levels. This is because, as mentioned above, the high frequency reflected signal is converted, by the detector 260 into a DC signal, which is relatively much easier and less expensive to manage.

Furthermore, the fact that detection and measurement processes do not require the use of an external receiver (as is the case in the known solutions), simplifies testing and quality control procedures during manufacturing which in turn represents an additional advantage of the solution proposed herein.

Still furthermore, upon manufacturing transmitter circuits in large numbers, it is possible to turn on and transmit power from each individual circuit one after the other and measure the reflected power (if any) in each case to determine any mismatch between the output of the transmitter and the input of the antenna. The measured values corresponding to the different devices may be compared to obtain an overall knowledge of the match or mismatch situation in each device.

If the expected output power is calibrated and predetermined, each measurement may be compared to such predetermined output power.

In case the output power is not calibrated then the measurements made on the various devices may provide relative power values between the plurality of the transmitters which may also be useful for testing and quality control processes. For example if power measurements of the reflective signals in the plurality of the devices show relatively small deviations between the measured values, it may be concluded that the devices are operating under acceptable conditions; whereas a large deviation between measured values for such devices may be an indication of malfunction in the device which shows such large deviation in measurements.

One practical implementation of the proposed technique may be in designing phased array antenna assemblies, which as such are known systems. Briefly, such assemblies comprise an array of antennas each typically configured to transmit or receive a signal having a phase which is typically different from the phase of the adjacent antennas. Variation in the relative phase difference between the signals transmitted from the antennas may give rise to constructive or destructive interferences between the transmitted signals and thereby cause a change in the arrays overall radiation direction.

A simplified schematic representation of a phased array antenna in which the principles of the present disclosure are employed is shown in FIG. 3. The phased array assembly 300 comprises a plurality of antenna-balanced PA pairs 300-1, . . . , 300-$n$ meaning that each antenna 301-1, . . . , 301-$n$ in the array 300 is connected to a respective balanced PA 302-1, . . . , 302-$n$.

Therefore, during manufacturing or deployment, each pair of antenna-balanced PA 300-$k$ (k being an integer from 1 to n) may need to be tested in order to assess proper connectivity and impedance match. This task may be performed using the solution as proposed herein in a simple and cost effective manner.

It is assumed that in a non-faulty condition, i.e. all the antennas transmitting properly, the array 300 is set to transmit in a first direction of radiation as shown by arrow B1. In case a fault condition occurs due to which one of the antennas fails to transmit, the direction of radiation of the array may change to a second direction as shown by arrow B2. In such a case, the technique proposed herein may be used in order to easily identify the faulty antenna and take corrective measures. For example, as the case may be, the faulty antenna may be replaced by a new one, the faulty antenna-balanced PA pair may be replaced by a new pair; or if replacement is not immediately available, the phases of the non-faulty antennas may be adjusted in order to direct the transmitted radiation back in the desired direction of radiation B1.

The testing and measurement processes may be performed in the same way as mentioned above with reference to FIG. 2 and here again there is no need to individually detect the RF signals at reception because the detection may be made directly at the transmission side.

Optionally, a further detector may be coupled to a further isolated port of the balanced PA. Referring back to FIG. 2, isolated port 233 is shown to be coupled to a second detector 270. For the sake of clarity, this optional feature is represented in FIG. 2 using broken lines.

Detector 270 may be configured to detect connection failures between the ports 232, 224 of the first Lange coupler 230 and the input ports (not specifically referenced by numbers) of the PAs 201, 220 respectively.

One practical use of the above option is to detect PA failures. As it is well-known, PAs are prone to heating up significantly during operation. Overheating in these devices may cause damages in them.

A failure in a PA as a consequence of such damage may result in a notable change in its input impedance.

Therefore, in case one of the PAs, e.g. element 210, is damaged and its input impedance is changed, an impedance mismatch will be present and the input signal 281 is reflected back into the first Lange coupler 230 through port 232. The reflected signal is directed toward port 233 as shown by arrow A' and is then detected by detector 270 in a similar manner as described with reference to detector 260. This detector 270, therefore serve the purpose of a built-in self tester in the apparatus 200.

It is to be noted that the detector 270 may be configured for detecting the difference in power between two reflected signals. For example a reflected signal entering into the Lange coupler through port 232 and another reflected signal entering into the Lange coupler through port 234 may both be directed to the output port 233 of the Lange coupler 230. As one of the reflected signals has no phase shift and the other reflected signal has undergone 90 degrees phase shift, the two signals may be subtracted from each other in the detector 270.

This operation allows for detecting a situation in which both PAs 210 and 220 are damaged and therefore both signals 281 and 282 are reflected back at substantially 100% of their power. As the respective nominal power values corresponding to signals 281 and 282 are known, a measurement of their difference by the detector 270 may be compared to the nominal values to assess the presence of fault. For example, if the measurement shows a value equal to or near the difference of the nominal power values of the two signals, this would be indicative of presence of fault in both PAs 210 and 220.

In general it may be stated that if a PA is damaged, either its input impedance, or its output impedance or both will undergoes some change. These changes can be detected through the life-time of the device and can be used to detect problems.

Apparatus 200 may be manufactured using discrete components or it may be made as an integrated circuit. The size and the manufacturing options may be determined depending on the intended use of the apparatus. For example, designs employing lower transmission frequencies may require larger sizes and thus be manufactured with discrete components; whereas relatively high frequencies may allow the use of smaller circuit designs thus making it possible to manufacture the apparatus on a chip.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP)

hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
a first input port for receiving a first alternating signal;
a first output port for transmitting a second alternating signal with an output power;
a first quadrature coupler and a second quadrature coupler configured to process said first alternating signal to thereby provide the second alternating signal; and
a first detector configured to:
receive a third alternating signal, the third alternating being a reflection of at least a portion in power of the second alternating signal;
convert said third alternating signal into a rectified signal; and
measure a power of said rectified signal;
wherein said measured power of the rectified signal is indicative of a power of the reflected third signal.

2. The apparatus of claim 1, configured to determine an amount of output power transmitted by the apparatus based on the measured power of the rectified signal.

3. The apparatus of claim 1 further comprising a balanced power amplifier which includes first and second power amplifiers connected in parallel between the first and the second quadrature couplers, wherein:
the first quadrature coupler is configured to receive said first alternating signal through a first port;
the second quadrature coupler is configured to output the second alternating signal through a second port; receive said third alternating signal through said second port and output said third alternating signal through a third port to said detector.

4. The apparatus of claim 3, wherein:
the first quadrature coupler is configured to divide said first alternating signal into an in-phase signal and a quadrature signal having 90 degree phase difference between each other;
the first power amplifier is configured to amplify the in-phase signal;
the second power amplifier is configured to amplify the quadrature signal;
the second quadrature coupler is configured to receive said amplified in-phase signal and said amplified quadrature signal and apply a 90 degree phase shift to the in-phase signal, sum the amplified phase shifted in-phase signal and the amplified quadrature signal to obtain the second alternating signal, and output said second alternating signal.

5. The apparatus of claim 3, wherein the quadrature coupler is a Lange coupler or a 90 degree coupler.

6. The apparatus of claim 1, wherein the detector comprises a rectifier circuit.

7. The apparatus of claim 1 wherein the rectified signal is an envelope representing variations in time of peak values of the third alternating signal.

8. The apparatus of claim 1, wherein the apparatus is formed in an integrated circuit.

9. The apparatus of claim 3, comprising a second detector configured to receive a fourth alternating signal, said fourth alternating signal being a reflection of at least a portion in power of the in-phase signal from said first power amplifier.

10. The apparatus of claim 3, comprising a second detector configured to receive a fifth alternating signal, said fifth alternating signal being a reflection of at least a portion in power of the quadrature signal from said second power amplifier.

11. The apparatus of claim 3, comprising a second detector configured to receive a fourth and a fifth alternating signals, said fourth alternating signal being a reflection of at least a portion in power of the in-phase signal from said first power amplifier and said fifth alternating signal being a reflection of at least a portion in power of the quadrature signal from said second power amplifier; the apparatus being further configured to measure a difference in power between said fourth and fifth reflected alternating signals.

12. The apparatus of claim 11, wherein the apparatus is configured to compare the measured difference in power with a difference between predetermined nominal power values to determine a presence of a faulty condition.

13. A transmitter comprising:
an antenna; and
an apparatus, including:
a first input port for receiving a first alternating signal;
a first output port for transmitting a second alternating signal with an output power to said antenna;
a first quadrature coupler and a second quadrature coupler configured to process said first alternating signal to thereby provide the second alternating signal; and
a first detector configured to:
receive a third alternating signal, the third alternating being a reflection of at least a portion in power of the second alternating signal from the input port of said antenna;
convert said third alternating signal into a rectified signal; and
measure a power of said rectified signal;
wherein said measured power of the rectified signal is indicative of a power of the reflected third signal.

14. The transmitter of claim 13, configured to determine an amount of output power transmitted by the transmitter based on the measured power of the rectified signal.

15. The transmitter of claim 13 wherein the apparatus further comprises a balanced power amplifier which includes first and second power amplifiers connected in parallel between the first and the second quadrature couplers, wherein:
the first quadrature coupler is configured to receive said first alternating signal through a first port;
the second quadrature coupler is configured to output the second alternating signal through a second port; receive said third alternating signal through said second port and output said third alternating signal through a third port to said detector.

16. The transmitter of claim 15, wherein:
the first quadrature coupler is configured to divide said first alternating signal into an in-phase signal and a quadrature signal having 90 degree phase difference between each other;
the first power amplifier is configured to amplify the in-phase signal;
the second power amplifier is configured to amplify the quadrature signal;
the second quadrature coupler is configured to receive said amplified in-phase signal and said amplified quadrature signal and apply a 90 degree phase shift to the in-phase signal, sum the amplified phase shifted in-phase signal and the amplified quadrature signal to obtain the second alternating signal, and output said second alternating signal.

17. A phased array antenna assembly comprising:
an array of antennas wherein one or more antennas from the array are each coupled to a respective apparatus; the apparatus including:
a first input port for receiving a first alternating signal;
a first output port for transmitting a second alternating signal with an output power to an antenna from said one or more antennas;
a first quadrature coupler and a second quadrature coupler configured to process said first alternating signal to thereby provide the second alternating signal; and
a first detector configured to:
receive a third alternating signal, the third alternating being a reflection of at least a portion in power of the second alternating signal from the input port of said antenna;
convert said third alternating signal into a rectified signal;
measure a power of said rectified signal;
wherein said measured power of the rectified signal is indicative of a power of the reflected third signal.

18. The phased array antenna assembly of claim 17, configured to determine an amount of output power transmitted by said antenna based on the measured power of the rectified signal.

19. The phased array antenna assembly of claim 17, wherein the apparatus further comprises a balanced power amplifier which includes first and second power amplifiers connected in parallel between the first and the second quadrature couplers, wherein:
the first quadrature coupler is configured to receive said first alternating signal through a first port;
the second quadrature coupler is configured to output the second alternating signal through a second port; receive said third alternating signal through said second port and output said third alternating signal through a third port to said detector.

20. The phased array antenna assembly of claim 17, wherein the assembly is configured to identify a faulty antenna from the array of antenna and adjust a phase of at least one non-faulty antenna to adjust a direction of transmission of radiation from the assembly.

* * * * *